No. 781,427. PATENTED JAN. 31, 1905.
W. P. HUSSEY.
TRUCK.
APPLICATION FILED DEC. 24, 1903.

Witnesses
H. G. Stuart
P. P. King

Inventor
Wm. P. Hussey
By V. H. Lockwood
Attorney

No. 781,427.       Patented January 31, 1905.

UNITED STATES PATENT OFFICE.

WILLIAM P. HUSSEY, OF INDIANAPOLIS, INDIANA, ASSIGNOR TO THE STANDARD DRY KILN COMPANY, OF INDIANAPOLIS, INDIANA, A CORPORATION OF INDIANA.

TRUCK.

SPECIFICATION forming part of Letters Patent No. 781,427, dated January 31, 1905.

Application filed December 24, 1903. Serial No. 186,516.

*To all whom it may concern:*

Be it known that I, WILLIAM P. HUSSEY, of Indianapolis, county of Marion, and State of Indiana, have invented a certain new and useful Truck; and I do hereby declare that the following is a full, clear, and exact description thereof, reference being had to the accompanying drawings, in which like figures refer to like parts.

This truck was invented and designed especially as a brick-truck for use in driers.

The object was to make the truck simple and strong and economical in construction.

One feature of the invention consists in mounting the wheels of the truck independent of each other, so that they will travel without difficulty on a track at a curve, and in using housings for the wheels which not only carry the wheels but connect all the other parts or elements of the structure to it and together. In other words, the housings carry the wheels, the cross-bars, and side bars of the truck all secured and interlocked rigidly in place.

Another feature consists in using channel-iron for the side bars and cross-bars and placing the housings between two separate parallel cross-bars, said cross-bars by their channels enveloping the ends of the housings.

These and the various details of construction, which will hereinafter be brought out, make a very strong and solid metal truck with a smooth top and protected wheels.

The full nature of this invention will be understood from the accompanying drawings and the following description and claims.

Figure 1:
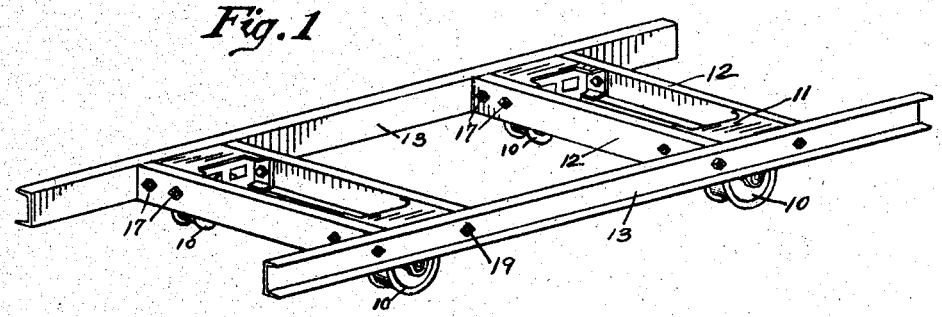
Figure 2:
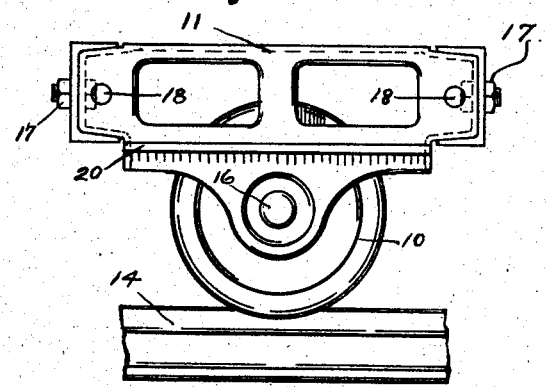
Figure 3:
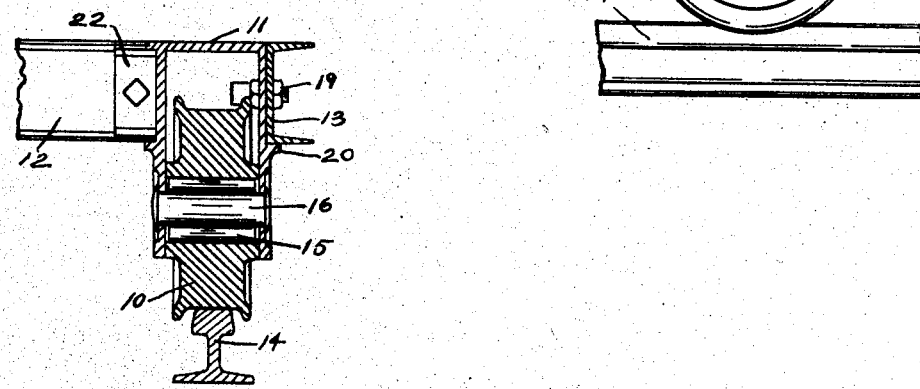

In the drawings, Figure 1 is a perspective view of a metal truck. Fig. 2 is a side elevation of a truck-wheel, the housing in which it is mounted, the cross-bars of the truck, a portion of the track-rail under the truck-wheel, the side bar of the truck being omitted and the track being broken away. Fig. 3 is a central transverse section through one of the wheels and its housing and a portion of the cross-bar shown in elevation and broken away and the track-rail shown in cross-section.

In detail the truck, besides the bolts and nuts, is made up of only four elements or parts—the wheels 10, the housings 11, the cross-bars 12, and the side bars 13. There are four wheels, four housings, four cross-bars, and two side bars.

The wheels herein shown are double-flanged wheels adapted to run on the track-rail 14. They have roller-bearings 15 and spindles 16, as shown, the spindle being secured to the housing and the wheels being bored large enough to admit a number of rollers in each around the spindle, so that the weight of the truck bears upon the rollers below the spindle and the weight of the rollers keep them together below the spindle, so that there is a smooth bearing. This construction has been rendered possible by having the wheels mounted on independent spindles instead of on a single axle that is mounted loosely in the bearings of the truck.

The housings are skeleton frames made of metal having a closed top, two open skeleton-like sides with downward central extensions for the mounting of the wheel. The ends of the housings are slightly tapered and on the top and bottom are recessed to form seats for the top and bottom flanges of the side bars 12. The housings have a longitudinally-extending ledge 20 along the outer side thereof, upon which the side bars 13 may rest. They also have inward extensions 22, as seen in Figs. 1 and 3, through which the bolt may pass for securing the cross-bar to the housing.

The cross-bars 12 are all alike and made of channel-iron and fit snugly over the reduced ends of the housings 11 and are bolted to said ends by the bolts 17. The dimensions of the reduced ends of the housings are exactly the same as the dimensions of the channel of the cross-bars, so that there is a tight fit.

Near each end of each housing, on the side, there is a hole 18, through which a bolt 19 passes for securing the side bars to the housings. These side bars are alike and made of the same channel-iron as the cross-bars. The side bars rest upon the side ledges 20 on the housings. The tops of the side bars and crossbars and boxes are all flush, making a smooth top surface for the truck.

In assembling the housings are first provided with the wheels, and then the cross-bars are secured in place, making two small two-wheel trucks. The parts of the entire truck are shipped in this way without further assembling, so that they may be packed in close compact form. At the place of use the side bars 13 are bolted to the ends of the two constructions previously assembled. This makes the entire truck.

The chief strain in use, especially in brick-driers and the like, comes upon the cross-bars, and therefore they are very firmly anchored in place because they envelop the reduced snugly-fitting ends of the housings. The construction of the truck absolutely prevents any twisting or dislocation of the parts. The truck is preferably rigid and firm and will remain so unless the bolts become very loose. A great trouble with trucks in driers is the looseness resulting from the heat. This truck being made of iron and being put together as described resists any action of the heat. Its formation of a plurality of similar parts and similar material that may be partially assembled before shipping and completely assembled by any one after shipping renders it very convenient and well adapted for the particular work of such a truck. The housings being closed on top keep the mud, &c., from accumulating in the housings and about the wheels.

What I claim as my invention, and desire to secure by Letters Patent, is—

1. A metal truck formed of independent wheels, housings therefor with the top closed, cross-bars removably secured to the corresponding ends of each oppositely-located pair of housings, and side bars removably secured to the outer sides of said housings, said housings, cross-bars and side bars being flush with each other on the top side thereof.

2. A metal truck formed of side bars and cross-bars made of channel-iron, wheels, and housings for the wheels that are formed at each end so as to fit snugly in the channel of the cross-bar, and means for removably securing the side bars and cross-bars to the housings.

3. A metal truck formed of wheels, housings in which said wheels are mounted having a horizontal ledge on the side of each and each end of the housing being tapered substantially as shown and described, cross-bars secured to said housings and enveloping the tapered ends thereof, side bars resting upon the ledges on the outside of the housings, and bolts for securing the cross-bars and side bars to the housings.

In witness whereof I have hereunto affixed my signature in the presence of the witnesses herein named.

WILLIAM P. HUSSEY.

Witnesses:
V. H. LOCKWOOD,
N. ALLEMONG.